US012440895B2

(12) United States Patent
Harvey

(10) Patent No.: US 12,440,895 B2
(45) Date of Patent: Oct. 14, 2025

(54) BINDING AGENTS FOR PRINTING 3D GREEN BODY OBJECTS

(71) Applicant: PERIDOT PRINT LLC, Palo Alto, CA (US)

(72) Inventor: Natalie Harvey, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 408 days.

(21) Appl. No.: 17/294,063

(22) PCT Filed: Jun. 7, 2019

(86) PCT No.: PCT/US2019/036087
§ 371 (c)(1),
(2) Date: May 14, 2021

(87) PCT Pub. No.: WO2020/246991
PCT Pub. Date: Dec. 10, 2020

(65) Prior Publication Data
US 2022/0119658 A1      Apr. 21, 2022

(51) Int. Cl.
| | |
|---|---|
| *B22F 10/14* | (2021.01) |
| *B22F 1/107* | (2022.01) |
| *B33Y 10/00* | (2015.01) |
| *B33Y 70/10* | (2020.01) |
| *C09D 11/033* | (2014.01) |

(Continued)

(52) U.S. Cl.
CPC .............. *B22F 10/14* (2021.01); *B22F 1/107* (2022.01); *B33Y 10/00* (2014.12); *B33Y 70/10* (2020.01); *C09D 11/033* (2013.01); *C09D 11/037* (2013.01); *C09D 11/107* (2013.01); *C09D 11/322* (2013.01); *B22F 2304/10* (2013.01)

(58) Field of Classification Search
None
See application file for complete search history.

(56) References Cited

U.S. PATENT DOCUMENTS

| | | | |
|---|---|---|---|
| 4,902,459 A | | 2/1990 | Matsubara et al. |
| 5,376,403 A | * | 12/1994 | Capote ................. H01B 1/22 252/514 |

(Continued)

FOREIGN PATENT DOCUMENTS

| | | |
|---|---|---|
| CN | 106928666 A | 7/2017 |
| CN | 107163490 A | 9/2017 |

(Continued)

OTHER PUBLICATIONS

"ISOBAM Water Soluble Polymer", Kuraray Co., Ltd. (2010) (Year: 2010).*

*Primary Examiner* — Sally A Merkling
*Assistant Examiner* — Sean P. O'Keefe
(74) *Attorney, Agent, or Firm* — Dierker & Kavanaugh, P.C.

(57) ABSTRACT

The present disclosure relates to a binding agent for printing a 3D green body object. The binding agent includes from about 0.3 wt % to about 3 wt % adhesion promoter including an aromatic maleic anhydride-containing copolymer, from about 2 wt % to about 20 wt % a (meth)acrylic latex binder, from about 10 wt % to about 40 wt % solvent package including from about 3 wt % to about 40 wt % of a coalescing solvent, and from about 40 wt % to about 88 wt % water. The weight percentage ranges are based on total content of the binding agent.

14 Claims, 3 Drawing Sheets

(51) Int. Cl.
*C09D 11/037* (2014.01)
*C09D 11/107* (2014.01)
*C09D 11/322* (2014.01)

(56) References Cited

U.S. PATENT DOCUMENTS

| | | | |
|---|---|---|---|
| 6,194,061 B1 * | 2/2001 | Satoh | C08J 7/048 |
| | | | 428/424.8 |
| 6,312,627 B1 | 11/2001 | Molnar | |
| 8,877,332 B2 | 11/2014 | Trummer et al. | |
| 2005/0254987 A1 * | 11/2005 | Azzi | B22F 1/10 |
| | | | 419/36 |
| 2016/0289415 A1 * | 10/2016 | Okashimo | B33Y 70/00 |
| 2016/0333153 A1 * | 11/2016 | Hirata | B29C 64/153 |
| 2018/0290377 A1 | 10/2018 | Talken et al. | |
| 2019/0111479 A1 | 4/2019 | Kasperchik et al. | |

FOREIGN PATENT DOCUMENTS

| | | | | |
|---|---|---|---|---|
| CN | 107385366 A * | 11/2017 | | B22F 1/0074 |
| WO | WO-2012045736 A1 | 4/2012 | | |
| WO | WO-2015160939 A1 | 10/2015 | | |
| WO | WO-2018156207 A1 * | 8/2018 | | B22F 1/0011 |

* cited by examiner

BINDING AGENTS FOR PRINTING 3D GREEN BODY OBJECTS

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

Figure 1:
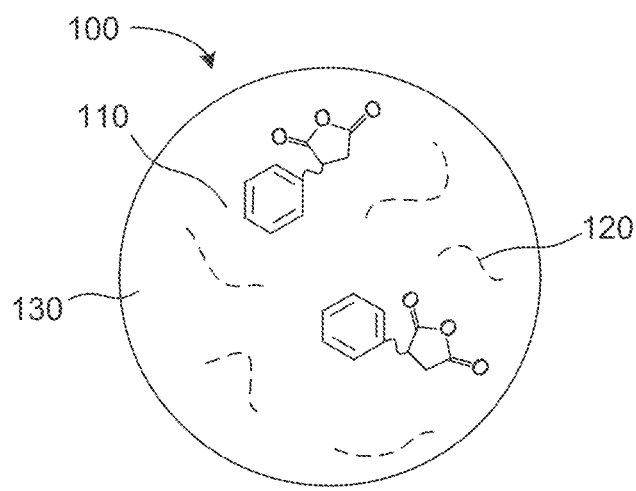
FIG. 1 graphically illustrates a schematic view of an example binding agent for printing a 3D green body object in accordance with examples of the present disclosure.

An example 3-dimensional (3D) printing process can be an additive process that can involve the application of successive layers of build material with chemical binders or adhesives printed thereon to bind the successive layers of build materials together. In some processes, thermal fusing, melting, sintering, or the like can be utilized to form a green body object and then a sintered metal three-dimensional physical object. More specifically, a binder fluid can be selectively applied to a layer of particulate build material on a build platform to pattern a selected region of the layer and then another layer of the particulate build material is applied thereon. The binder fluid can be applied to another layer of the particulate build material and these processes can be repeated to form a green body object (also known as a green part) of the 3D printed object that is ultimately formed. The binder fluid can be capable of penetrating the layer of the particulate build material onto which it is applied, and/or spreading around an exterior surface of the particulate build material and filling void spaces between particles of the particulate build material. The binder fluid can include a binder that can hold the particulate build material of the green body object together. In some 3D printing methods, the binder fluid can include latex which can be adhered to the particulate build material, upon coalescence and give the green body object structural integrity. The green body object can be moved to a sintering oven, or another sintering source and exposed to heat to sinter the particulate build material of the green body object together and form the 3D printed object. Strengthening the green body object can improve the structural integrity of the green body object and can permit automated part extraction.

In accordance with example of the present disclosure, a binding agent for printing a 3D green body object can include from about 0.3 wt % to about 3 wt % adhesion promoter including an aromatic maleic anhydride-containing copolymer; from about 2 wt % to about 20 wt % a (meth)acrylic latex binder; from about 10 wt % to about 40 wt % solvent package, wherein the solvent package includes from about 3 wt % to about 40 wt % of a coalescing solvent; and from about 40 wt % to about 88 wt % water. The weight percentage ranges are based on total content of the binding agent. In one example, the maleic anhydride-containing copolymer is a styrene maleic anhydride copolymer. In another example, the adhesion promoter is present at from about 0.5 wt % to about 2.5 wt %. In yet another example, the binding agent further includes a colorant. In a further example, the coalescing solvent includes a C3 to C8 aliphatic diol. In one example, the coalescing solvent has a boiling point temperature ranging from about 100° C. to about 300° C. In one example, the binding agent is devoid of surfactant.

Also presented herein is a three-dimensional printing kit. The three-dimensional printing kit includes a particulate build material including from about 80 wt % to 100 wt % metal particles based on the total weight of the particulate build material; and a binding agent including water, from about 0.3 wt % to about 3 wt % adhesion promoter including an aromatic maleic anhydride-containing copolymer based on total content of the binding agent, and from about 2 wt % to about 20 wt % a (meth)acrylic latex binder based on total content of the binding agent. In one example, the metal particles include aluminum, titanium, copper, cobalt, chromium, nickel, vanadium, tungsten, tungsten carbide, tantalum, molybdenum, magnesium, gold, silver, ferrous alloy, stainless steel, steel, an alloy thereof, or an admixture thereof. In another example, the metal particles have a D50 particle size distribution value of from about 4 μm to about 150 μm. In yet another example, the maleic anhydride-containing copolymer is an aromatic maleic anhydride copolymer. In a further example, the binding agent includes from 3 wt % to 40 wt % coalescing solvent based on total content of the binding agent.

Further presented herein is a method for three-dimensional printing. The method includes iteratively applying individual build material layers of a particulate build material which includes from about 80 wt % to 100 wt % metal particles based on the total weight of the particulate build material; based on a 3D object model, selectively applying a binding agent to individual build material layers to define individually patterned layers of a 3D green body object, wherein the binding agent includes water, from about 0.3 wt % to about 3 wt % adhesion promoter including an aromatic maleic anhydride-containing copolymer based on total content of the binding agent, and from about 2 wt % to about 20 wt % a (meth)acrylic latex binder based on total content of the binding agent; and heating the individually patterned layers of the 3D green body object to drive off water and further solidify the 3D green body object. In one example, selectively applying of the binding agent occurs by ejecting the binding agent from an inkjet printhead onto metal particles, where the quantity of (meth)acrylic latex binder ranges from 1 gsm/layer of metal powder to about 3 gsm/layer of metal powder for a metal layer thickness ranging from 30-80 μm; and heating of the individually patterned layers of the 3D green body object occurs at a temperature ranging from about 100° C. to about 250° C. In another example, the method can further include separating the 3D green body object from the particulate build material and sintering the metal particles of the 3D green body object in a fusing oven.

It is noted that when discussing the binding agent for printing a 3D green body object, a three-dimensional printing kit, and method for three-dimensional printing herein, such discussions can be considered applicable to one another whether or not they are explicitly discussed in the context of that example. Thus, for example, when discussing an adhesion promoter in the context of a binding agent, such disclosure is also relevant to and directly supported in the context of the three-dimensional printing kit and/or the method for three-dimensional printing, and vice versa. It is also understood that terms used herein will take on their ordinary meaning in the relevant technical field unless specified otherwise. In some instances, there are terms defined more specifically throughout the specification or included at the end of the present specification, and thus, these terms have a meaning consistent with these more specific definitions.

Binding Agent

To bind particulate build material together during the build process and form a green body object, a binding agent can be applied to the particulate build material on a layer by layer basis. In some instances, heat (below a sintering temperature of the particulate build material) can be applied on a layer by layer basis. Upon formation of a plurality of layers of the green body object is fully formed. Thus, as shown in FIG. 1, a binding agent 100 can include, for example, from about 0.3 wt % to about 3 wt % adhesion promoter 110 including an aromatic maleic anhydride-containing copolymer, from about 2 wt % to about 20 wt % a (meth)acrylic latex binder 120, from about 10 wt % to about 40 wt % solvent package including from about 3 wt % to about 40 wt % of a coalescing solvent, and from about 40 wt % to about 88 wt % water. The adhesion promoter and the (meth)acrylic latex are represented schematically. The coalescing solvent and water are illustrated collectively as liquid vehicle 130. Weight percentage ranges are based on total content of the binding agent.

In further detail, the adhesion promoter including an aromatic maleic anhydride-containing copolymer can include hydrophobic and hydrophilic components. The hydrophobic components can be aliphatic or aromatic, but there is an aromatic ring present on the structure in examples herein. The hydrophilic components can include carboxylic acid functional groups, ester functional groups, or a combination thereof. In one example, the maleic anhydride-containing copolymer can include a potassium salt of poly(isobutylene-alt-maleic anhydride), styrene-maleic anhydride, or a combination thereof. In ONE example, adhesion promoter can be a styrene-maleic anhydride copolymer. The styrene-maleic anhydride can be a mono-ester, or an ammonium salt.

The aromatic maleic anhydride-containing copolymer can have a weight average molecular weight that can range from about 1000 MW to about 2000 MW. In yet other examples, the maleic anhydride-containing copolymer can have a weight average molecular weight that can range from about 1200 MW to about 1800 MW. In one example, the maleic anhydride-containing copolymer is an aromatic maleic anhydride copolymer.

The adhesion promoter including the aromatic maleic anhydride-containing copolymer can be present in the binding agent from about 0.3 wt % to about 3 wt %. In other examples, the adhesion promoter including an aromatic maleic anhydride-containing copolymer can include from about 0.5 wt % to about 2.5 wt %, from about 1 wt % to about 3 wt %, or from about 0.5 wt % to about 1.5 wt %. It is believed that the adhesion promoter including an aromatic maleic anhydride-containing copolymer can interact electronically with an oxidized metal surface of a particulate build material and can interact with the (meth)acrylic latex binder.

The (meth)acrylic latex binder can include an acrylate or methacrylate latex binder. The term "(meth)acrylic" or "(meth)acrylate" refers to monomers, copolymerized monomers, functional moieties of a polymer, etc., include both examples of an acrylate or methacrylate (or a combination of both), or acrylic acid or methacrylic acid (or a combination of both), as if independently listed or enumerated. When referring to "acrylic" versus "acrylate," for example, it is understood that it can be in the acid form or the salt form, which may typically merely be a function of pH.

The (meth)acrylic latex binder can include polymer particles made from (A) a co-polymerizable surfactant and (B) styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In one example, the (meth)acrylate binder can include 2-phenoxyethyl methacrylate, cyclohexyl methacrylate, cyclohexyl acrylate, methacrylic acid, or a combination thereof.

In one example, the (meth)acrylic latex binder can include particles that can have an average particle size from about 10 nm to about 300 nm. In yet another example, the (meth)acrylic latex binder can include particles that can have an average particle size from about 50 nm to about 250 nm. In yet other examples, the (meth)acrylic latex binder can include particles that can have an average particle size that can range from about 20 nm to 200 nm. As used herein, "particle size" refers to the diameter of spherical particles, or to the longest dimension of non-spherical particles. Particle size can be measured by differential light scattering (DLS) or particle sizing via microscopic observation.

The (meth)acrylate latex binder can be present in the binding agent at from about 2 wt % to about 20 wt %. In yet other examples, the (meth)acrylate latex binder can be present at from about 5 wt % to about 20 wt %, at from about 10 wt % to about 15 wt %, or from about 8 wt % to about 18 wt %. A chain of the (meth)acrylate latex binder can entangle at elevated temperatures and can provide stability to a particulate build material.

The binding agent can include from about 10 wt % to about 40 wt % solvent package for carrying the multifunctional carboxylic acid and the (meth)acrylate latex binder. In some examples, the solvent package can be present at from about 15 wt % to about 30 wt % or from about 12 wt % to about 36 wt %. The solvent package can include aliphatic alcohols, aromatic alcohols, alkyl diols, glycol ethers, polyglycol ethers, 2-pyrrolidinones, caprolactams, formamides, acetamides, long chain alcohols, and combinations thereof. For example, the solvent package can include primary aliphatic alcohols, secondary aliphatic alcohols, 1,2-alcohols, 1,3-alcohols, 1,5-alcohols, ethylene glycol alkyl ethers, propylene glycol alkyl ethers, C6 to C12 homologs of polyethylene glycol alkyl ethers, N-alkyl caprolactams, unsubstituted caprolactams, both substituted and unsubstituted formamides, both substituted and unsubstituted acetamides, combinations thereof, and the like. Other example solvents can include propyleneglycol ether, dipropyleneglycol monomethyl ether, dipropyleneglycol monopropyl ether, dipropyleneglycol monobutyl ether, tripropyleneglycol monomethyl ether, tripropyleneglycol monobutyl ether, dipropyleneglycol monophenyl ether, 2-pyrrolidinone, 2-methyl-1,3-propanediol, and combinations thereof.

The solvent package can include from about 3 wt % to about 40 wt % of a coalescing solvent, based on a total content of the binding agent. In yet other examples, the coalescing solvent can be present at from about 10 wt % to about 30 wt %. The coalescing solvent can be a high volatile solvent. As used herein, "high volatile solvent" refers to a solvent that has a boiling point temperature ranging from about 100° C. to about 300° C. In one example, the coalescing solvent can include a C3 to C8 aliphatic diol. In another example, the coalescing solvent can include propanediol, butanediol, pentanediol, hexanediol, heptanediol, octanediol, or a combination thereof. In one example, the coalescing solvent can be 1,2 butanediol. The coalescing solvent can act as a coalescing agent for the (meth)acrylate latex binder and can permit softening of the (meth)acrylate latex binder thereby allowing for chain entanglement.

The binding agent can further include water, which is defined to be a separate component relative to the solvent package. Water can be present in the formulation at from about 40 wt % to about 88 wt %, from about 50 wt % to about 75 wt %, or from about 45 wt % to about 80 wt %, based on a total weight of the binding agent. In one example, the water can be deionized.

In some examples, the binding agent can further include a surfactant. The surfactant can include SURFYNOL® SEF, SURFYNOL® 104, or SURFYNOL® 440 (Evonik Industries AG, Germany); CRODAFOS™ N3 Acid or BRIJ® 010 (Croda International Plc., Great Britain); TERGITOL® TMN6, TERGITOL® 15S5, TERGITOL® 15S7, DOWFAX® 2A1, DOWFAX® 8390 (Dow, USA); DYNOL® (Evonik Industries, Germany), or a combination thereof. The surfactant or combinations of surfactants, if present, can be included in the binding agent at from about 0.1 wt % to about 5 wt % and in some examples, can be present at from about 0.5 wt % to about 2 wt %.

In other examples, the binding agent can further include a colorant. The colorant can be a dye or pigment. The quantity of colorant in the binding agent can vary based on the desired strength of the color. In some examples, a colorant can be present at from 0.1 wt % to about 5 wt % in the binding agent.

Three-Dimensional Printing Kit

Figure 2:
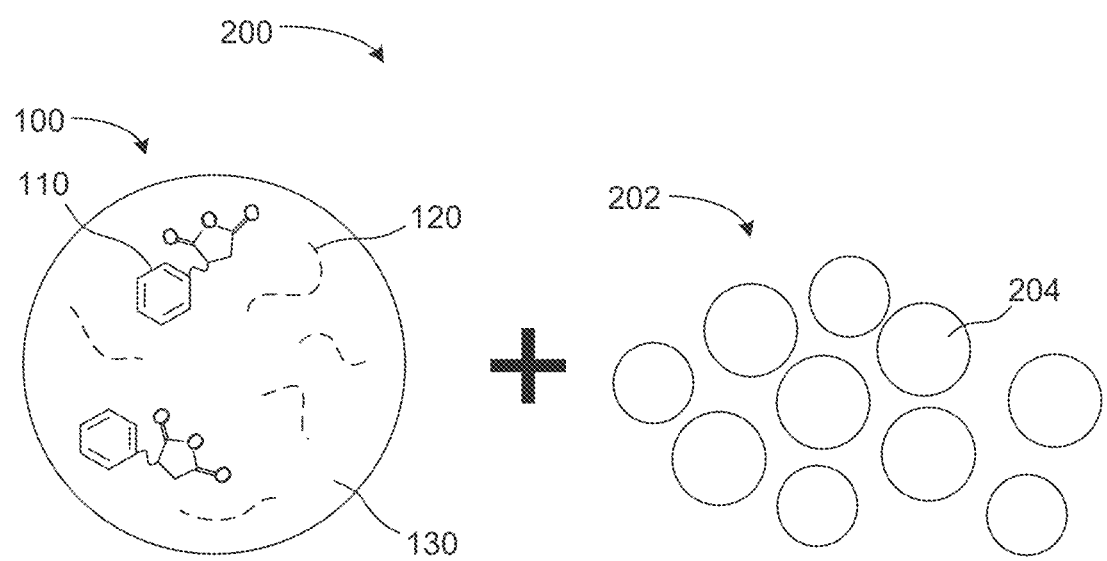
FIG. 2 graphically illustrates a schematic view of an example three-dimensional printing kit in accordance with examples of the present disclosure.

In further detail, a three-dimensional printing kit 200 is shown in FIG. 2, and can include a particulate build material 202 including from about 80 wt % to about 100 wt % metal particles 204 based on the total weight of the particulate build material 202 and a binding agent 100. The binding agent can include for example from about 0.3 wt % to about 3 wt % adhesion promoter including an aromatic maleic anhydride-containing copolymer 110 based on total content of the binding agent, and from about 2 wt % to about 20 wt % a (meth)acrylic latex binder 120 based on total content of the binding agent. The binding agent can be as described above.

The particulate build material can include from 80 wt % to 100 wt % metal particles based on the total weight of the particulate build material. In an example, the metal particles can be a single phase metallic material composed of one element. In this example, the sintering temperature may be below the melting point of the single element. In another example, the metal particles can be composed of two or more elements, which may be in the form of a single phase metallic alloy or a multiple phase metallic alloy. In these other examples, sintering generally can occur over a range of temperatures. With respect to alloys, materials with a metal alloyed to a non-metal (such as a metal-metalloid alloy) can be used as well.

In some examples, the particulate build material can include particles of aluminum, titanium, copper, cobalt, chromium, nickel, vanadium, tungsten, tungsten carbide, tantalum, molybdenum, magnesium, gold, silver, ferrous alloy stainless steel, steel, an alloy thereof, or admixture thereof.

The temperature(s) at which the metallic particles of the particulate build material sinter can be above the temperature of the environment in which the patterning portion of the 3D printing method is performed (e.g., patterning at from about 100° C. to about 250° C., and sintering at from about 500° C. to about 3,500° C.). In some examples, the metal particles may have a melting point ranging from about 500° C. to about 3,500° C. In other examples, the metal particles may be an alloy having a range of melting points.

The particle size of the particulate build material can be similarly sized or differently sized. In one example, the D50 particle size of the particulate build material can range from 4 μm to 150 μm. In some examples, the particles can have a D50 particle size distribution value that can range from about 25 μm to about 100 μm, or from about 50 μm to about 150 μm. Individual particle sizes can be outside of these ranges, as the "D50 particle size" is defined as the particle size at which about half of the particles are larger than the D50 particle size and about half of the other particles are smaller than the D50 particle size (by weight based on the metal particle content of the particulate build material). As used herein, particle size refers to the value of the diameter of spherical particles or in particles that are not spherical can refer to the longest dimension of that particle. The particle size can be presented as a Gaussian distribution or a Gaussian-like distribution (or normal or normal-like distribution). Gaussian-like distributions are distribution curves that may appear essentially Gaussian in their distribution curve shape, but which can be slightly skewed in one direction or the other (toward the smaller end or toward the larger end of the particle size distribution range.

Methods of Three-Dimensional Printing

Figure 3:
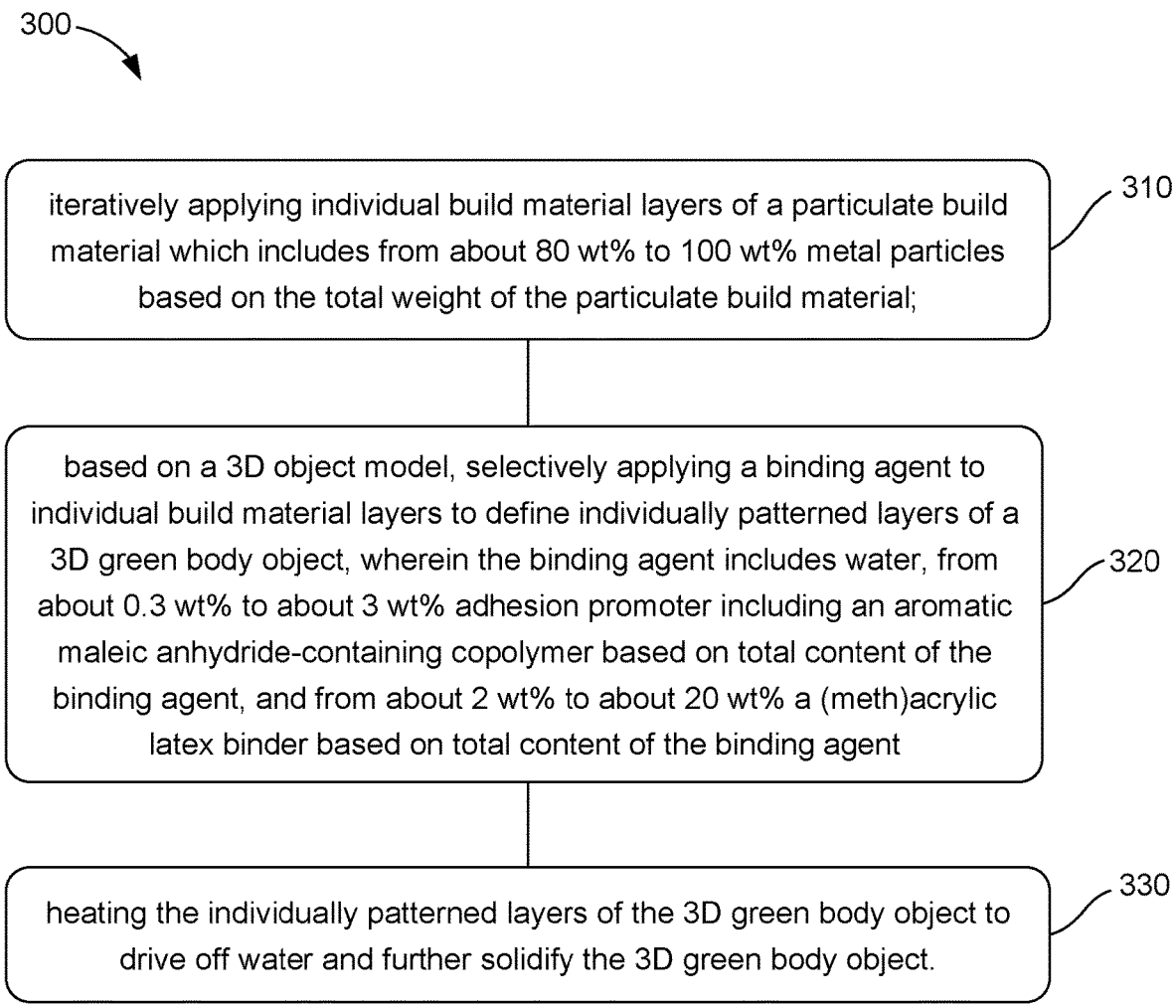
FIG. 3 is a graphically illustrates an example method of three-dimensional printing in accordance with examples of the present disclosure.

In still another example, as shown in FIG. 3, a method 300 of three-dimensional printing can include iteratively applying 310 iteratively applying individual build material layers of a particulate build material which includes from about 80 wt % to 100 wt % metal particles based on the total weight of the particulate build material; based on a 3D object model, selectively applying 320 a binding agent to individual build material layers to define individually patterned layers of a 3D green body object, and heating 430 the individually patterned layers of the 3D green body object to drive off water and further solidify the 3D green body object.

Figure 4:
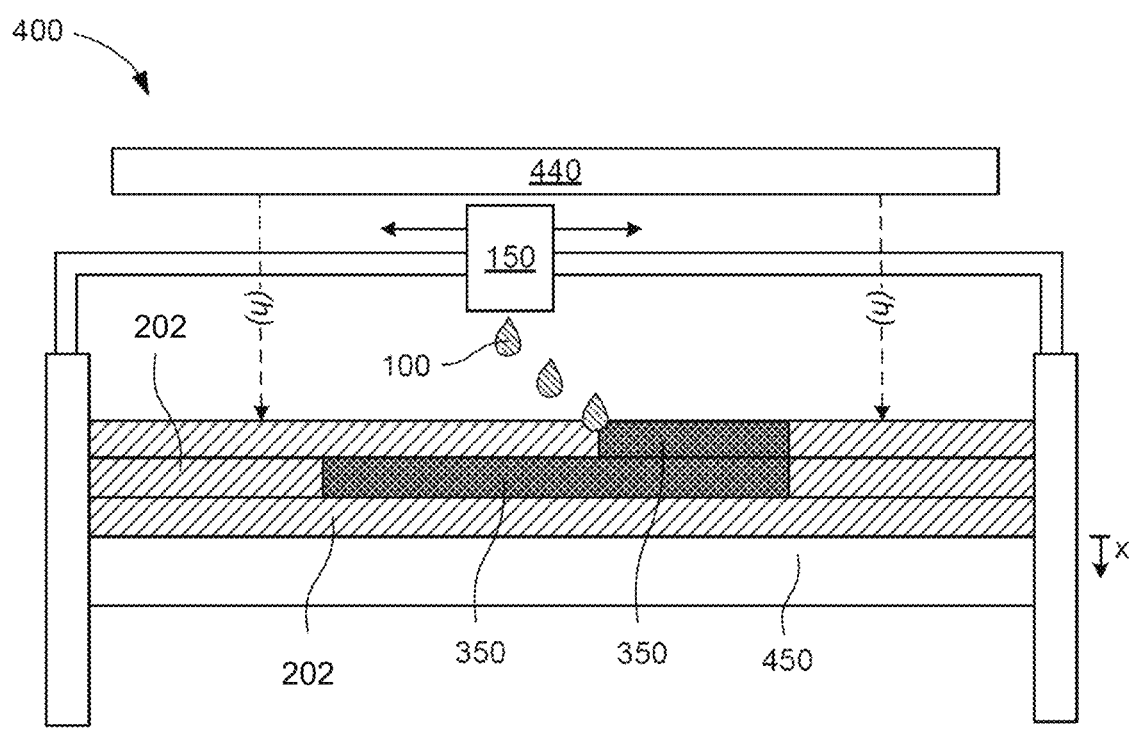
FIG. 4 is a flow diagram illustrating an example method of three-dimensional printing in accordance with examples of the present disclosure.

In one example as illustrated in FIG. 4, the method can be carried out using a three-dimensional printing system 400 or apparatus. In that system, as shown, heat can be applied from a heat lamp 440 above a powder bed 450, and/or heat (h) can be provided by the powder bed, for example. The particulate build material 202 and binding agent 100 can be as described previously in FIGS. 1 and 2, for example. Upon fusion, a green body object 350 can be formed in a layer-by-layer process, where the build platform 450 is dropped (x) after each layer is formed, followed by the spreading of an additional powder layer thereon to continue the build, for example. In further detail, the particulate build material can be layered at a thickness that can range from about 50 μm to about 300 μm, for example. The respective layers can be patterned one layer at a time until the green body object is formed. The selective applying of the binding agent can occur by ejecting the binding agent from printhead 150 onto the metal particles, where the quantity of (meth)acrylic latex binder can range from, for example, 1 gsm/layer of metal powder to about 3 gsm/layer of metal powder for a metal layer thickness ranging from 30-80 μm; and heating the individually patterned layers of the 3D green body object to drive off water and further solidify the 3D green body object.

Following application of the binding agent on the particulate build material, in some instances, the particulate build material having binding agent applied thereto can be heated to an elevated temperature to assist with solidifying the green body object. In one example, the heating of the individually patterned layers of the 3D green body object can occur at a temperature ranging from about 100° C. to about 250° C. The elevated temperature can be at or above the minimum film-forming temperature (MMFT) or the glass transition temperature (Tg) of the (meth)acrylate latex binder. Heat can also or alternatively be applied to more rapidly remove solvent from the binding agent during individual layer formation. In some instances, the elevated temperature can be applied by a heated build platform; a heated particulate build material, e.g., preheated prior to dispensing; an overhead heating source, such as a heat lamp, e.g., an ultra-violet lamp or an infrared lamp; or a combination thereof.

Upon coalescing or otherwise binding of the particulate build material the 3D green body object can be separated from the particulate build material and moved to a heating device, such as a sintering or fusing oven. The eventual sintering temperature range can vary, depending on the material, but in one example, the sintering temperature can range from about 10° C. below the melting temperature of the metal particles of the particulate build material to about 50° C. below the melting temperature of the metal particles of the particulate build material. In another example, the sintering temperature can range from about 100° C. below the melting temperature of the metal particles of the particulate build material to about 200° C. below the melting temperature of the metal particles of the particulate build material. The sintering temperature can depend upon the particle size and period of time that heating occurs, e.g., at a high temperature for a sufficient time to cause particle surfaces to become physically merged or composited together). For example, a sintering temperature for stainless steel can be about 1400° C. and an example of a sintering temperature for aluminum or aluminum alloys can range from about 550° C. to about 620° C. In one example the sintering can be at a temperature ranging from about 500° C. to about 3,500° C. In another example, the temperature can range from about 600° C. to about 1,500° C., or from about 800° C. to about 1200° C. The sintering temperature can sinter and fuse the metal particles to form a printed 3D object.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the phrase "green body object," green part," and "layered green body" refers to any intermediate structure prior to sintering, including a green 3D object or object layer(s). As a green body object, the particulate build material can be (weakly) bound together by one or more components of a binding agent. Typically, a mechanical strength of the green body object is such that it can be handled or extracted from a build platform to place in an annealing or sintering oven. It is to be understood that any build material that is not patterned with the binding agent is not considered to be part of the green body object, even if it is adjacent to or surrounds the green body object. For example, unprinted particulate build material acts to support the green body object while contained therein, but the particulate build material is not part of the green body object unless it is printed with binding agent that is used to generate a solidified part prior to annealing or sintering.

As used herein, the terms "3D part," "3D object," or the like, refer to the target 3D object that is being built. The 3D object can be referred to as a "sintered" 3D object, indicating it has been sintered, or a "green body object" or "green" 3D object, indicating it has been solidified, but not sintered.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following illustrates an example of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of a Binding Agent

Seven differing binding agents for three-dimensional printing of a green body object were prepared. The formulations included, a comparative formulation that excluded maleic anhydride-containing copolymer, three binding agent formulations with added surfactant and three binding agent formulations without surfactant (replacing the surfactant with water content). The formulations were prepared by mixing the components together in accordance with formulations indicated in Tables 1A-1B, as follows:

TABLE 1A

Comparative Binding Agent Formulations (C1-C3)

| Component | | C1 (wt %) | C2 (wt %) | C3 (wt %) |
|---|---|---|---|---|
| 1,2-butanediol | Coalescing Solvent | 26 | 26 | 26 |
| TERGITOL ® TMN-6 | Surfactant | 0.9 | — | — |
| TERGITOL ® 15-S-7 | Surfactant | 0.9 | 1.8 | — |
| Poly(isobutylene-alt-maleic anhydride) potassium salt (PIAM-K) | Non-Aromatic Maleic Anhydride Adhesion Promotor | — | 1.7 | 1.7 |
| (Meth)acrylate latex binder | Binding Agent | 12 | 12 | 12 |
| Colored dye | Colorant | 0.4 | 0.4 | 0.4 |
| Water | Solvent | Balance | Balance | Balance |

TABLE 1B

Binding Agent Formulations (BA1-BA4)

| Component | | BA1 (wt %) | BA2 (wt %) | BA3 (wt %) | BA4 (wt %) |
|---|---|---|---|---|---|
| 1,2-butanediol | Coalescing Solvent | 26 | 26 | | |
| TERGITOL ® 15-S-7 | Surfactant | 1.8 | — | 1.8 | — |
| Aqueous Base Solution of styrene-maleic anhydride (SMA1440H) | Aromatic Maleic Anhydride Adhesion Promotor | 1.7 | 1.7 | — | — |
| Aqueous Base Solution of styrene-maleic anhydride (SMA2000H) | Aromatic Maleic Anhydride Adhesion Promotor | — | — | 1.7 | 1.7 |

TABLE 1B-continued

Binding Agent Formulations (BA1-BA4)

| Component | | BA1 (wt %) | BA2 (wt %) | BA3 (wt %) | BA4 (wt %) |
|---|---|---|---|---|---|
| (Meth)acrylate latex binder | Binding Agent | 12 | 12 | 12 | 12 |
| Colored dye | Colorant | 0.4 | 0.4 | 0.4 | 0.4 |
| Water | Solvent | Balance | Balance | Balance | Balance |

TERGITOL ® is available from Sigma Aldrich (USA).

Example 2—Evaluation of Green Body Object Strength

A 70 μm layer of powder build material, including stainless steel, SS316L metal particles, having a D50 particle size of ~8.5 μm was dispersed evenly on a build platform. The various formulations of Tables 1A-1C were selectively ejected from a thermal inkjet print head onto the powder build material to form a green body 3D object layer. The layering was repeated until a green body object in the form of a 134 mm×34 mm×8 mm bar was formed for the various binding agents of the present disclosure (BA1-BA6) as well as the comparative binding agent (Comp BA). The green body object in the shape of a bar was then heated 60 minutes at 150° C. to remove drive off water and further solidify the 3D green body object. The green body object was then transferred to a vacuum oven and the strength evaluated. The green body object's structural integrity was evaluated by 3 point bend testing in accordance with ASTM D790. The testing was evaluated in a Criterion Single Column Frame using 5 mm rollers at a 25 mm span. The preload slack was set to 0.5 N of force and the test was run at a strain rate of 0.165 (mm/mm)/min. The part was compressed until there was an 80% drop in load. The green body object strength data is provided in Table 2, as follows:

TABLE 2

Green Body Object Strength

| Binding Agent ID | Green Body Object Strength (mPA) |
|---|---|
| C1 | 2.7 |
| C2 | 2.27 |
| C3 | 2.54 |
| BA1 | 3.95 |
| BA2 | 8.56 |
| BA3 | 5.55 |
| BA4 | 9.37 |

As shown in Table 2 above, as well as in FIG. 5, incorporating an aromatic maleic anhydride-containing copolymer compared to not including a maleic anhydride composition or even incorporating a non-aromatic maleic anhydride-containing copolymer produced lower green body object strength. The presence of surfactant seemed to diminish green body object strength as well, but not down to the levels where there was no aromatic maleic anhydride-containing copolymer present.

Example 3—Green Body Object Strength Vs. Percent Contone

The SMA 2000H containing formulation without added surfactant (BA4) was used to generate a green body object, and was printed alongside a second green body object prepared using a comparative formulation. Different contone levels were used in the comparison, namely 100, 120, and 140. The higher the number, the higher the concentration of binding agent used. For reference, a contone of 100 represents an amount of fluid ranging from 150-200 ng of binding agent, with 120 and 140 scaled accordingly, e.g., 20 would represent 1.2× the binding agent dispensed at a contone of 100.

TABLE 3

Green Body Object Strength vs. Percent Contone, X-axis Orientation

| | Percent Contone | | |
|---|---|---|---|
| | 100 | 120 | 140 |
| | Green Body Object Strength (mPa) | | |
| C1 | 4.5 | 5.5 | 7.5 |
| BA4 | 5 | 6.4 | 8.4 |

TABLE 4

Green Body Object Strength vs. Percent Contone, Y-Axis Orientation

| | Percent Contone | | |
|---|---|---|---|
| | 100 | 120 | 140 |
| | Green Body Object Strength (mPa) | | |
| C1 | 3.50 | 4.00 | 4.40 |
| BA4 | 4.68 | 5.18 | 6.72 |

As shown in Tables 3 and 4 above and in FIGS. 6 and 7, the percent contone of green body objects printed with the binding agent formulations incorporating SMA 2000H had improved green body object strength over the green body objects printed with the comparative binding agent that did not include the aromatic maleic anhydride-containing copolymer as an adhesion promoter.

What is claimed is:

1. A binding agent for printing a 3D green body object, the binding agent consisting of:
   1.7 wt % of an adhesion promoter including an aromatic maleic anhydride-containing copolymer having a weight average molecular weight ranging from about 1000 MW to about 1800 MW;
   12 wt % of a (meth)acrylic latex binder;
   26 wt % of a solvent package, wherein the solvent package consists of 1,2-butanediol as a coalescing solvent;
   0.4 wt % of a colorant; and
   59.9 wt % of water,
   wherein weight percentage ranges are based on a total content of the binding agent, and wherein the binding agent is jettable via an inkjet printhead.

2. The binding agent of claim 1, wherein the aromatic maleic anhydride-containing copolymer is a styrene maleic anhydride copolymer.

3. The binding agent of claim 1, wherein the coalescing solvent has a boiling point temperature ranging from about 100° C. to about 300° C.

4. The binding agent of claim 1, wherein the aromatic maleic anhydride-containing copolymer includes a mono-ester.

5. The binding agent of claim 1, wherein the aromatic maleic anhydride-containing copolymer includes an ammonium salt.

6. The binding agent of claim 1, wherein the aromatic maleic anhydride-containing copolymer includes a potassium salt of poly(isobutylene-alt-maleic anhydride).

7. The binding agent of claim 1, wherein the (meth)acrylic latex binder includes particles made from (A) a co-polymerizable surfactant and (B) styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof.

8. A three-dimensional printing kit, comprising:
   a particulate build material comprising from about 80 wt % to 100 wt % of metal particles based on a total weight of the particulate build material; and
   a binding agent consisting of:
      59.9 wt % of water;
      1.7 wt % of an adhesion promoter including an aromatic maleic anhydride-containing copolymer having a weight average molecular weight ranging from about 1000 MW to about 1800 MW
      12 wt % of a (meth)acrylic latex binder
      26 wt % of a solvent package, wherein the solvent package consists of 1,2-butanediol as a coalescing solvent; and
      0.4 wt % of a colorant,
      wherein weight percentage ranges are based on a total content of the binding agent, and wherein the binding agent is jettable via an inkjet printhead.

9. The three-dimensional printing kit of claim 8, wherein the metal particles are selected from the group consisting of aluminum particles, titanium particles, copper particles, cobalt particles, chromium particles, nickel particles, vanadium particles, tungsten particles, tungsten carbide particles, tantalum particles, molybdenum particles, magnesium particles, gold particles, silver particles, ferrous alloy particles, stainless steel particles, steel particles, an alloy thereof, and an admixture thereof.

10. The three-dimensional printing kit of claim 8, wherein the metal particles have a D50 particle size distribution value ranging from about 4 μm to about 150 μm.

11. The three-dimensional printing kit of claim 8, wherein the aromatic maleic anhydride-containing copolymer is a styrene maleic anhydride copolymer.

12. A method of three-dimensional printing, comprising:
   iteratively applying individual build material layers of a particulate build material, wherein the particulate build material includes from about 80 wt % to 100 wt % metal particles based on a total weight of the particulate build material;
   based on a 3D object model, selectively applying a binding agent to the individual build material layers to define individually patterned layers of a 3D green body object, wherein the binding agent includes:
59.9 wt % of water;
1.7 wt % of an adhesion promoter including an aromatic maleic anhydride-containing copolymer having a weight average molecular weight ranging from about 1000 MW to about 1800 MW
12 wt % of a (meth)acrylic latex binder
26 wt % of a solvent package, wherein the solvent package consists of 1,2-butanediol as a coalescing solvent; and
0.4 wt % of a colorant,
wherein weight percentage ranges are based on a total content of the binding agent, and wherein the binding agent is jettable via an inkjet printhead; and
heating the individually patterned layers of the 3D green body object to drive off water and further solidify the 3D green body object.

13. The method of three-dimensional printing of claim 12, wherein:
the selectively applying of the binding agent occurs by ejecting the binding agent from the inkjet printhead onto the metal particles, wherein a quantity of the (meth)acrylic latex binder ranges from 1 gsm/layer of metal powder to about 3 gsm/layer of metal powder for a metal layer thickness ranging from 30 µm to 80 µm; and
the heating of the individually patterned layers of the 3D green body object occurs at a temperature ranging from about 100° C. to about 250° C.

14. The method of three-dimensional printing of claim 12, further comprising separating the 3D green body object from the particulate build material and sintering the metal particles of the 3D green body object in a fusing oven.

* * * * *